3,301,636
NON-CAKING CAUSTIC SODA

Joseph V. Otrhalek, Dearborn, Mich., assignor to Wyandotte Chemicals Corporation, Wyandotte, Mich., a corporation of Michigan
No Drawing. Filed Dec. 24, 1963, Ser. No. 333,179
5 Claims. (Cl. 23—184)

This invention relates to the manufacture of a caustic soda composition which is particularly useful in the preparation of detergents. More specifically, the invention relates to a method of treating caustic soda to significantly reduce its hygroscopic properties.

In many applications, it is desirable to use solidified caustic soda in flake, pellet, or granular form. However, such use is often seriously curtailed because of the extreme hygroscopic nature of caustic soda. Exposed to even minor amounts of moisture, the material becomes sticky and cakes, thereby interfering with further processing and, on some occasions, becoming unfit for its intended purpose.

As an example, in the preparation of detergents, caustic soda is mixed with cleansing agents such as trisodium phosphate or sodium pyrophosphate and other "detergent builders" to prepare the final formulation. Because of its hydgroscopic nature, this use of caustic soda presents both the manufacturer and the formulator with formidable problems. In the preparation of caustic soda composed of sub-divided particles, dilute caustic liquor is heated to concentrate the solution, the molten material is chilled and solidified into a sheet which is then subjected to further processing to obtain the desired particle form. The material is then sized, fines are removed, and finally the subdivided caustic is packaged for shipping to the ultimate user. Excessive moisture pickup during any of the foregoing stages may not only cause sticking of the caustic to the conveyor system, thereby interfering with further processing, but the wet caustic particles may adhere to each other to form composites of widely differing dimensions. Moreover, wet sodium hydroxide is very caustic and serious corrosion problems are presented.

The user of flake, pellet or granular caustic soda also encounters serious difficulties. In addition to facing the problems enumerated above, he also encounters additional problems in compounding the caustic particles with other constituents to formulate the final composition. Any moisture pickup during processing may result in a composite of caustic soda particles and/or adherence of the caustic to other constituents of the final formulation. The tendency to adhere and form composites is erratic, resulting in a non-homogeneous product with obvious disadvantages.

To ameliorate the problems due to the hygroscopic nature of caustic soda, the prior art has suggested several materials as coating agents for caustic particles. Thus, U.S. 2,639,221 suggests the preparation of sodium hydroxide for use in photographic developer powders by coating caustic soda particles with phthalic anhydride. U.S. 3,007,877 describes the preparation of composites formed by exposing caustic soda particles to steam to form a sticky mass which is then admixed with other ingredients to form one integral pellet usable in the preparation of detergents. The formed pellet, which still contains much surface moisture, is then mixed with amorphous silica or sodium carbonate to remove said surface moisture.

Neither of the foregoing represents a suitable solution to the reduction or elimination of the problems due to the hygroscopic nature of caustic soda in the detergent art. The prior materials are not normally constituents of detergents and thus represent an additional expense, and/or inordinately large amounts are required to obtain any degree of improvement. In some cases, the prior art coating agents may actually be considered to be contaminants for the final composition.

It is an object of this invention to provide a method for reducing the hygroscopic nature of caustic soda. Another object is to provide non-sticking, non-caking caustic soda particles, especially useful in a detergent application. Other objects will be apparent from the ensuing description of this invention.

In accordance with the present invention, the above and other objects are accomplished by coating the surface of caustic soda particles with an agent selected from the group consisting of the alkali metal salts of triglycollamic acid, alkali metal carboxymethylcellulose, saturated and unsaturated organic fatty acids containing from about 10 to 22 carbon atoms, and mixtures of the foregoing.

Throughout this specification and the appended claims, by "alkali metals" is meant to include the alkali metals useful in the detergent art, including lithium, sodium and potassium.

Usable fatty acids include, among others, capric, lauric, myristic, palmitic, arachidic, behenic, hypogeic and erucic acids. The preferred acids may be saturated or unsaturated and contain from 16 to 18 carbon atoms and include palmitic acid, stearic acid, oleic acid and linoleic acid. These acids are available commercially as a mixture, and for economic reasons the use of such mixtures is preferred.

Especially useful coating agents contemplated by this invention are the mono-, di- and tri-sodium salts of triglycollamic acid and sodium carboxymethylcellulose.

The method of this invention is particularly applicable in the processing of solid sodium hydroxide precipitated from concentrated caustic liquor. With one method for the preparation of solid caustic soda, the concentrated caustic liquor is frozen on a chilled, moving belt. By the use of a hammer mill or other suitable apparatus, the sheet is then broken into small pieces and further processed to obtain the desired form. The material is then sized and packaged for shipping. The coating agents of this invention may be applied directly to the sheet or they may be added after the sheet has been broken to obtain the desired particles.

In the "inclined pan" method of preparing caustic pellets, caustic liquor is sprayed on fine mesh seed pellets of caustic soda on an inclined pan. In such an operation, the coating agents of the invention may be applied after the spraying operation in the rear portion of the pan or the particles may be coated in a separate operation as by spraying, dusting or dipping. The coated pellets may then be sized and packaged without sticking or caking.

A feature of this invention is that the coating agents serve a dual purpose. In addition to their function to reduce the hygroscopic nature of the caustic soda, they are in their own right desirable constituents of detergent formulations. Thus, the alkali metal salts of triglycollamic acid are normaly useful in detergent compositions as sequestering agents, the alkali carboxymethylcellulose compounds have film-forming and emulsion stabilizing properties and the fatty acids react with caustic soda to form the sodium salts which have surfactant properties. Thus, the added expense and compatibility problems associated with prior art materials are eliminated.

Another feature of the present invention is that the coating agents function in two ways. Primarily, the agent serves to minimize moisture pickup by the caustic particles. However, of caustic particles containing the same amount of moisture, those particles coated with agents in accordance with the invention exhibit reduced sticking and caking tendencies.

The coating agents may be applied to the particles of sodium hydroxide in any suitable manner such as by dusting, spraying or dipping. Thus, when the coating agent is a powder it may be dusted over the caustic particles or admixed therewith in a tumbler or mixer, or similar apparatus. The solid coating agent may also be dissolved in an appropriate solvent and, as with liquid agents of this invention, may be sprayed over the caustic particles. With a third technique, the caustic particles may be dipped in a liquid coating agent or in a solution of a normally solid coating agent. Usually, from about 1 to 20% of the coating agent, based on the weight of the caustic soda, is adequate to sufficiently reduce the hygroscopic properties of the caustic particles. Oftentimes, from 2 to about 10% is optimum. It will be appreciated that the foregoing proportions are dependent upon the particular material used and the degree of protection to be rendered to the caustic particles.

The nature and effectiveness of the coating agents of this invention are further illustrated in the following example. It is pointed out that the example is offered only for illustrative purposes and is not meant to unduly limit the scope of the invention.

EXAMPLE I

Caustic soda pellets prepared from 74% caustic soda liquor and sized from ¼ to ½ inch were packed to a depth of ½" in 80 ml. weighing bottles. The open bottles were exposed in desiccators at 20% relative humidity over sulfuric acid at 75° F. The surface of the pellets was dusted with powders or sprayed with liquids as shown in the following table. The products were evaluated periodically by both measured weight change and visual observation of the dampness or wetness of the surface.

From the foregoing data, it is evident that the coating agents of this invention are superior in effectiveness in reducing the hygroscopic nature of caustic soda. It will be noted that the other constituents of detergent compositions such as trisodium phosphate, various sodium metasilicates and gluconic acid are not effective for this purpose. Moreover, the use of sodium carbonate suffers from the disadvantage of not being as effective as the instant coating agents even at a fourfold concentration.

I claim:
1. The method of reducing the hygroscopic properties of sodium hydroxide which comprises coating the hydroxide with a material selected from the group consisting of the alkali metal salts of triglycollamic acid, alkali metal carboxymethylcellulose, and mixtures of the foregoing.
2. A method of preparing non-caking sodium hydroxide especially useful in a detergent composition, which comprises coating sodium hydroxide particles with from about 1 to 20% of a material selected from the group consisting of the alkali metal salts of triglycollamic acid, alkali metal carboxymethylcellulose, and mixtures of the foregoing.
3. The method of claim 2 wherein said hydroxide is coated with the trisodium salt of triglycollamic acid.
4. The method of claim 2 wherein said sodium hydroxide is coated with sodium carboxymethylcellulose.
5. In the processing of caustic soda comprising precipitating a solid caustic soda from a concentrated caustic liquor, processing said solid to obtain a solid caustic soda of desired shape and size, and packaging said caustic, the improvement which comprises coating said solid caustic soda with from 1 to about 20% of a material selected from the group consisting of the alkali metal salts of triglycollamic acid, alkali metal carboxymethylcellulose, and mixtures of the foregoing.

*Table 1*

EFFECTIVENESS OF VARIOUS COATING AGENTS

| Coating Material | Weight Percent Added | Results After Aging at 20% Relative Humidity at 75° F. | | | | | |
|---|---|---|---|---|---|---|---|
| | | 1 Day | | 5 Days | | 12 Days | |
| | | Weight Percent Changed | Observation | Weight Percent Changed | Observation | Weight Percent Changed | Observation |
| Trisodium salt of triglycollamic acid (P) | 4 | +0.4 | D | 0.8 | D | 3.3 | D. |
| Sodium carboxymethylcellulose (P) | 4 | 0.3 | D | 0.9 | D | 2.7 | D. |
| C₁₆-C₁₈ Mixture of fatty acids (S) | 4 | 0.3 | D | 0.8 | D | 3.3 | D. |
| Trisodium phosphate (P) | 10 | 0.3 | D | 1.5 | SW | | |
| Sodium metasilicate (P) | 10 | 0.1 | SW | 0.7 | W | | |
| Mineral Oil (S) | 1 | 0.2 | D | 1.5 | W | | |
| 50% Gluconic acid (S) | 4 | 0.4 | SW | 2.0 | W | | |
| Sodium silicate (S) | 4 | 0.4 | SW | 1.3 | W | | |
| Sodium carbonate (P) | 18 | 0.3 | D | 1.5 | SW | | |

P = Powder; S = Liquid Spray; D = Dry; SW = Slightly Wet; W = Wet.

References Cited by the Examiner

UNITED STATES PATENTS

| | | | |
|---|---|---|---|
| 2,413,491 | 12/1946 | Fajans | 117—100 X |
| 2,513,997 | 7/1950 | Gibb | 117—100 |
| 2,843,484 | 7/1958 | Baxendale | 23—184 X |
| 2,846,308 | 8/1958 | Baxendale | 23—184 X |

OSCAR R. VERTIZ, *Primary Examiner.*

J. J. BROWN, *Assistant Examiner.*